Patented May 18, 1948

2,441,795

UNITED STATES PATENT OFFICE 2,441,795

STABILIZATION OF GLYCOLS

Edgar C. Britton and Arthur R. Sexton, Midland, Mich., assignors to The Dow Chemical Company, Midland, Mich., a corporation of Delaware No Drawing. Application August 6, 1945, Serial No. 609,319

3 Claims. (Cl. 252—77)

This invention relates to stabilizing lower alkylene glycols against thermal decomposition.

In certain types of aircraft and automotive engines, the liquid coolant, instead of running at the conventional temperature of 100° C. or less, commonly circulates at 150° C. in a closed system, and may occasionally reach 200° C. or higher, perhaps for an extended period. The problem of selecting a coolant which will operate satisfactorily at these temperatures and yet will not freeze even at extreme winter temperatures is a difficult one. Ethylene glycol, undiluted or together with a lesser proportion of water, is most frequently chosen as the coolant, but it has the undesirable property of decomposing slowly at the higher temperatures mentioned to form organic acids, carbon, and gummy tars. These acids, when formed, tend to corrode the metallic parts of the circulating system, and the carbon and tar ultimately foul the heat-transfer surfaces and throttle circulation. In consequence, with ethylene glycol coolants, periodic overhauling of the circulating system is necessary, sometimes at short intervals.

In an effort to provide a more satisfactory liquid coolant for operation at higher temperatures, it has now been found that the lower alkylene glycols, such as ethylene glycol, may be stabilized against thermal decomposition of the type mentioned by incorporating therein a small proportion of a substance produced by reacting a wood oil derived from the distillation of hardwood with a nitrogen compound containing an —NHR group, in which R is hydrogen or a hydrocarbon radical. These substances almost completely restrain thermal decomposition of the glycols, both in the undiluted state and in mixtures thereof with the same or a lesser weight of water, at temperatures up to 200° C., and very markedly retard decomposition even when the glycols are maintained liquid under pressure at temperatures as high as 300° C.

Glycol compositions stabilized in accordance with the invention not only are useful as coolants for internal combustion engines but are satisfactory as liquid heat-transfer agents in general at temperatures within the range mentioned. They are characterized by extremely low freezing points, good heat-transfer characteristics, and moderate viscosities, as well as thermal stability. The compositions may also be used as fluid pressure- and power-transmitting media.

The lower alkylene glycols to which the invention is applicable contain from two through five carbon atoms per molecule. Of these, ethylene glycol, and to a lesser extent industrial mixtures of propylene glycols and of butylene glycols, are of present commercial interest. Such glycols may be employed according to the invention in the undiluted state or mixed with an equal or lesser weight of water. With larger proportions of water the boiling points of the solutions are somewhat low for a high temperature fluid, and thermal decomposition is rarely a serious problem.

In so far as is known, any of the wood oils derived from the distillation of hardwood may be reacted with nitrogen compounds of the type mentioned to produce substances useful as stabilizers for glycols according to the invention. Of these oils, the one known as washed allyl oil is perhaps the most effective.

In the hardwood distillation industry, the pyroligneous liquor, after the removal of settled tars, is subjected to a rough distillation in which the overhead fraction is crude methanol containing the alcohol oils, and the residue is crude acetic acid together with the acid oils. A number of different alcohol oil fractions are separated from the crude methanol by rectification, and several other oils, generally termed light oils and heavy oils, are recovered from the crude acetic acid and from the settled tar. All these fractions, which are complex mixtures of organic compounds, are included within the term "wood oils" as generally used, and are available as articles of commerce. The details of separation of these individual oils are well known in the art, and are discussed, for example, in U. S. Patents 1,975,091 and 2,223,299. All such oils are useful in making thermal stabilizers for glycols, with the alcohol oils being preferred.

In the rectification of crude methanol, as well as of the pyroligneous acid itself, after the commercial methyl acetone and methanol have been distilled, there is obtained a fraction boiling higher than these latter, but lower than acetic acid, the cut usually being made near 70° C. This fraction, which is known as wood spirits residue (U. S. 2,176,055), is the source of the washed allyl oil which is a preferred stabilizer according to the invention. In separating the latter, the wood spirits residue is first mixed with a roughly equal volume of water to remove soluble materials, particularly allyl alcohol, leaving an insoluble portion known as raw allyl oil. This raw oil is then mixed with aqueous sodium hydroxide in a quantity sufficient to neutralize any acids and to saponify esters present, the mixture being heated slightly until reaction ceases. The remaining oily layer, which consists, at least in part, of water-insoluble unsaturated alcohols together with aldehydes and ketones, boils over the range of approximately 80° to 185° C., and is known as washed allyl oil. If desired, it may be steam-distilled to separate it from traces of high-boiling tars.

The glycol stabilizers of the invention are prepared by reacting a wood oil as described, e. g. washed allyl oil, with a nitrogen compound containing an —NHR group, in which R is hydrogen or a hydrocarbon radical. Basic nitrogen compounds containing the —NH$_2$ group are preferred. Typical of the nitrogen compounds which may be used are ammonia, both anhydrous and aqueous, ammonium salts, such as the chloride, sulfate, acetate, cyanate, thiocyanate, and sulfamate, aliphatic and aromatic amines, e. g. methyl amine, ethyl amine, and aniline, amino-alcohols, e. g. ethanolamine, as well as urea, thiourea, guanidine, diphenyl-guanidine, and sulfanilic acid. The interaction of the two materials is preferably carried out by mixing the wood oil with a lesser weight of the nitrogen compound and heating the mixture in a closed vessel at a temperature sufficient to cause reaction but insufficient to permit thermal decomposition of the products, and for a time sufficient to allow the reaction to reach completion. Temperatures of from 150° to 250° C. are preferred, in which case a heating time of only one to three hours is usually required, although longer times at lower temperatures may be used. If desired, an acid catalyst, e. g. hydrochloric acid, may also be present to accelerate reaction. The resulting products are ordinarily used directly as stabilizers.

In preparing thermally stabilized glycol compositions according to the invention, the wood oil-nitrogen compound reaction product is simply stirred into the undiluted or aqueous glycol, in which it is soluble to a limited extent. Alternatively, the stabilizer may be made up as a strong solution in a mutual solvent, such as alcohol, and the solution stirred into the glycol. A small proportion of the reaction product is all that is required to effect stabilization, 0.2 to 5 per cent by weight of the glycol usually being satisfactory, with 0.5 per cent or more being preferred.

The wood oil-nitrogen compound stabilizers, in addition to preventing carbon and tar formation in heated glycols and glycol-water mixtures, also minimize corrosion of metals by these liquids because of the fact that they almost completely restrain development of acidic substances by decomposition of the glycols. They also function to a moderate degree as inhibitors in the conventional sense of retarding the corrosion of metals by other agents, such as air, which may be dissolved in the glycol solution. However, when extremely corrosive conditions are to be encountered, it is preferable to rely on the wood oil-nitrogen compound products as thermal stabilizers only, and to introduce in addition a small proportion of a conventional corrosion inhibitor. Since many such inhibitors are themselves unstable or volatile at temperatures of 200° to 300° C., it is important to select an inhibitor which is not affected adversely by heating. Sodium silicate, usually from 0.5 to 5 per cent by weight of the glycol, is a preferred choice.

While the heat-transfer media of the invention ordinarily consist of the glycol and the stabilizer, with or without water, minor proportions of other ingredients, such as anti-foaming agents, leak-stopping compounds, and dyes, as well as the conventional inhibitors already mentioned, may be added as desired.

The following examples will serve to illustrate the invention, but are not to be construed as limiting its scope. In the examples, a testing apparatus was employed consisting of an electrically heated closed iron chamber of about 400 cc. capacity and a circulating system for withdrawing the liquid being tested from a reservoir, forcing it under a pressure of 100 to 120 pounds per square inch into one end of the heated chamber, removing it from the other end of the chamber through a relief valve, cooling it, and returning it to the reservoir. The rate of circulation was controlled at about 800 cc. per hour. Weighed polished test specimens of aluminum, iron, brass, and copper were placed in the heated chamber throughout each run. The purposes of the metal specimens were to have present in the system the metals normally used in liquid-cooled engines and also to observe the rates of corrosion of the metals.

In the examples, the stabilizers were prepared as follows:

I. A mixture of 200 cc. of washed allyl oil and 10 grams of ammonium thiocyanate was heated in an iron autoclave at 170° C. for 1 hour.

II. A mixture of 100 cc. of washed allyl oil and 10 grams of urea was heated at 210° C. for 3 hours.

III. A mixture of 1500 grams of washed allyl oil, 300 grams of aniline, and 350 grams of 32 per cent hydrochloric acid was heated at a reflux temperature for 21 hours. The product was washed with aqueous alkali, and the resulting oily layer was separated and dried.

EXAMPLE 1.—AQUEOUS MIXTURES AT 200° C.

In each of the test runs summarized in the table, the system was filled with the given volume of a mixture of 70 parts by weight of ethylene glycol and 30 parts of water, to which (except in the case of the blank) 0.5 part of the stabilizer listed was added. The chamber was maintained at 200° C. and the circulation of the liquid was continued for the period stated. The pH of the liquid was measured at the beginning and at the end of the test. The appearance of the solution, the occurrence of aldehyde odor, and the presence of carbon and of tar in the chamber at the end of the test were noted. These details are given in the table. The metal test specimens present in the chamber were weighed at the start of each run and were reweighed, after polishing, at the end of the run. The losses in weight, calculated as milligrams per hour per square inch of exposed surface, are listed in the table.

From the results listed it will be seen that in the absence of a stabilizer, aqueous ethylene glycol underwent considerable decomposition at 200° C. to form aldehydes and carbon. Each of the stabilizers effectively prevented decomposition, and the solution and apparatus remained free of tar and carbon. The rates of corrosion of the metal specimens were extremely low in all the runs.

EXAMPLE 2.—UNDILUTED GLYCOL AT 300° C.

Tests similar to those of Example 1 were carried out on undiluted ethylene glycol, using 0.5 per cent of stabilizer, and maintaining the heated chamber at 300° C. The results are summarized in the table.

From these tests, it is evident that the glycol itself decomposes very rapidly at 300° C. The stabilizers entirely prevented formation of carbon and tar, although some aldehydes were formed. Even under these extremely severe conditions, the marked effectiveness of the stabilizers, and the low rates of corrosion of the metal specimens, are quite apparent.

*Table*

| Stabilizer | Time, hrs. | Volume, cc. | pH (Start) | pH (Finish) | Appearance | Aldehyde | Tar | Carbon | Corrosion Rate, mgm./hr./sq. in. | | | |
|---|---|---|---|---|---|---|---|---|---|---|---|---|
| | | | | | | | | | Aluminum | Iron | Brass | Copper |
| EXAMPLE 1.—70 PER CENT GLYCOL AT 200° C. | | | | | | | | | | | | |
| None | 100 | 2,565 | 7.3 | 5.8 | Rusty | Trace | None | Yes | 0.01 | 0.00 | 0.02 | 0.03 |
| I | 100 | 2,545 | 5.9 | 6.2 | Clear Red | do | do | None | 0.02 | 0.02 | 0.02 | 0.02 |
| II | 100 | 2,640 | 6.9 | 6.5 | Clear Tan | None | do | do | 0.00 | 0.01 | 0.04 | 0.00 |
| EXAMPLE 2.—PER 100 CENT GLYCOL AT 300° C. | | | | | | | | | | | | |
| None | [1] 12.5 | 1,020 | 7.0 | 5.8 | Dark Brown | Strong | Excessive | Excessive | (Excessive carbonization rendered measurement impossible.) | | | |
| I | 100 | 2,270 | 5.6 | 5.4 | Clear Green | Trace | None | None | 0.05 | 0.00 | 0.01 | 0.26 |
| II | 100 | 2,260 | 5.6 | 5.5 | Clear Red | do | do | do | 0.02 | 0.11 | 0.06 | 0.01 |
| III | 16 | 1,140 | 7.1 | 7.1 | Clear Tan | do | do | do | [2] | 0.01 | [2] | [2] |

[1] Discontinued because of excessive decomposition.
[2] Not measured, but specimens appeared unchanged.

What is claimed is:

1. A heat-transfer medium chemically stable at elevated temperatures consisting essentially of ethylene glycol and from about 0.2 to about 5 percent by weight thereof of a composition produced by heating washed allyl oil with a lesser proportion of aniline at a temperature of 150° to 250° C. until reaction ceases.

2. In a process wherein a liquid mixture of ethylene glycol and a lesser proportion of water is heated at an elevated temperature above 200° C., the method of minimizing decomposition of the liquid which comprises maintaining dissolved therein a composition produced by heating washed allyl oil with a lesser proportion of aniline at a temperature of 150° to 250° C. until reaction ceases, such composition being maintained in a proportion of from 0.2 to 5 percent by weight of the glycol.

3. A heat-transfer medium consisting essentially of a lower alkylene glycol containing from 2 through 5 carbon atoms per molecule and not over an equal proportion by weight of water stabilized against thermal decomposition by a composition produced by heating washed allyl oil with a lesser proportion of aniline at a temperature of 150° to 250° C. until reaction ceases, such composition being present in a proportion of from 0.2 to 5 percent by weight of the glycol.

EDGAR C. BRITTON.
ARTHUR R. SEXTON.

REFERENCES CITED

The following references are of record in the file of this patent:

UNITED STATES PATENTS

| Number | Name | Date |
|---|---|---|
| 2,080,422 | Hoover | May 18, 1937 |
| 2,258,578 | Chesley | Oct. 7, 1941 |